3,429,873
PREPARATION OF HESPERETIN DIHYDRO-
CHALCONE GLUCOSIDE
Robert M. Horowitz, Pasadena, and Bruno Gentili, Glendale, Calif., assignors to the United States of America as represented by the Secretary of Agriculture
No Drawing. Filed Oct. 14, 1966, Ser. No. 586,653
U.S. Cl. 260—210
Int. Cl. C08b 19/00; C07c 15/12
4 Claims

ABSTRACT OF THE DISCLOSURE

Hesperidin is treated with aqueous alkali and then hydrogenation is applied to produce hesperidin dihydrochalcone. This intermediate is refluxed with dilute aqueous hydrochloric acid to split off the rhamnose portion of the sugar moiety of the intermediate, yielding hesperetin dihydrochalcone glucoside, a compound which exhibits intense sweetness.

---

A nonexclusive, irrevocable, royalty-free license in the invention herein described, throughout the world for all purpose of the United States Government, with the power to grant sublicenses for such purposes, is hereby granted to the Government of the United States of America.

This invention relates to and has among its objects the provision of novel processes for preparing hesperetin dihydrochalcone glucoside. Further objects of the invention will be evident from the following description wherein parts and percentages are by weight unless otherwise specified.

In our Patent 3,087,821, issued Apr. 30, 1963, we have shown that certain dihydrochalcones exhibit intense sweetness and are useful for sweetening foods of all kinds. Among the compounds which exhibit this unusual property of intense sweetness is hesperetin dihydrochalcone glucoside.

We have now found that this compound can be prepared from hesperidin. Hesperidin is a flavanone glycoside which occurs naturally in oranges and lemons and is a byproduct of the commercial processing of such fruit. It is abundantly available, relatively low in price, and to date has had few or no commercial uses. Thus, the present invention is not only valuable as a means of making available a useful sweetening agent but also as a means of utilizing a byproduct of the orange and lemon processing industry.

In a practice of the process of the invention, the following steps are applied:

A. The starting compound, hesperidin, which is tasteless, is converted into hesperidin chalcone. This step is carried out in conventional manner as by contacting the starting compound with a solution of an alkali, for example, a 10–25% aqueous solution of NaOH or KOH at room temperature.

B. The hesperidin chalcone is then converted into the corresponding dihydrochalcone, by conventional hydrogenation. Thus, for example, the chalcone is contacted with hydrogen gas in the presence of a hydrogenation catalyst such as finely divided platinum, palladium, or Raney nickel. It may be observed that hesperidin dihydrochalcone is essentially tasteless.

C. The hesperidin dihydrochalcone is then converted into hesperetin dihydrochalcone glucoside by a hydrolytic technique. In this hydrolysis the sugar moiety of the hesperidin dihydrochalcone is attacked, resulting in splitting off the rhamnose portion thereof. The remainder of the molecule remains the same. In sum, the original β-rutinosyl radical (which may also be termed the 6-O-α-L-rhamnosyl-β-D-glucosyl radical) is converted into a β-D-glucosyl radical. The hesperetin dihydrochalcone glucoside can be more precisely named 3,2′,6′-trihydroxy-4-methoxy-4′-β-D-glucosyloxydihydrochalcone.

The chemical changes involved in the synthesis are demonstrated by the following formulas:

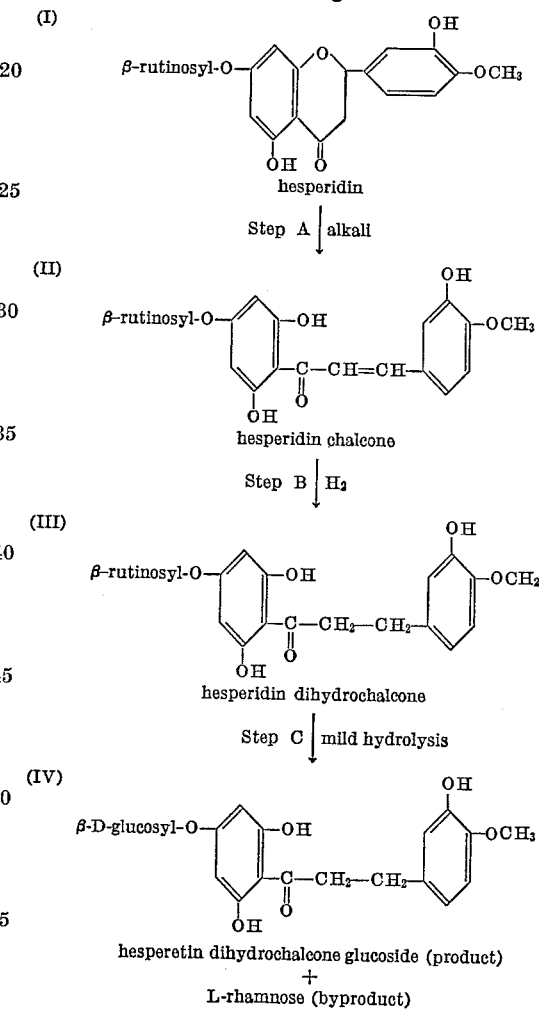

The hydrolysis of the β-rutinosyl radical (Step C) is shown more explicitly below:

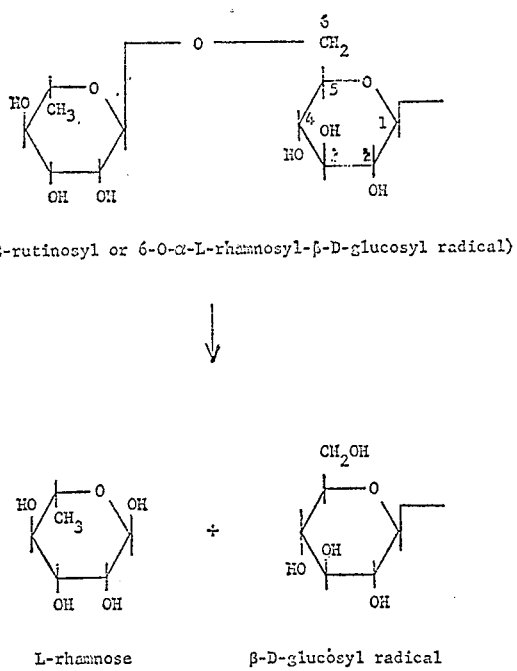

(β-rutinosyl or 6-O-α-L-rhamnosyl-β-D-glucosyl radical)

↓

L-rhamnose + β-D-glucosyl radical

In a practice of Step C, mild hydrolytic conditions are used to favor conversion of the rutinosyl radical into a glucosyl radical and to minimize a complete hydrolysis of the rutinosyl moiety. Such complete hydrolysis would yield the compound hesperetin dihydrochalcone which is only slightly sweet and is additionally very insoluble in water. (The structure of hesperetin dihydrochalcone may be visualized by considering Formula III above, wherein the β-rutinosyl radical is replaced by H.) In a typical application of Step C, an aqueous solution of hesperidin dihydrochalcone is acidified and boiled (under reflux) until a substantial proportion of hesperetin dihydrochalcone glucoside is formed. The degree of acidification should be adjusted to provide a dilute acid concentration in the solution, thus to yield the desired mild hydrolytic conditions. For example, where hydrochloric acid is used to attain the acid conditions, enough thereof is added so that the solution has an HCl normality of more than 0.01 but less than 1. Although hydrochloric acid is generally preferred for the acidification, one may use other acids, for example, hydrobromic, sulphuric, phosphoric, acetic, or the like. In any case, the appropriate acid concentrations to provide optimum results can be attained by conducting pilot runs with different levels of the selected acid, observing the yield obtained with each, and then conducting the hydrolysis of the main batch of dihydrochalcone, using the level of acid which has been determined to provide the optimum yield. After completion of the hydrolysis step, the product, hesperetin dihydrochalcone glucoside, may be readily separated from the completely-hydrolyzed byproduct, hesperetin dihydrochalcone, by applying conventional separation techniques capable of taking advantage of the fact that the product is soluble in water while the byproduct is very insoluble in water. One may alternatively use other separation techniques such as extraction with different organic solvents to selectively extract the respective compounds from the reaction mixture.

Beyond the chemical changes which occur in the aforesaid hydrolysis step: the *tasteless* compound, hesperidin dihydrochalcone, is converted into the *intensely sweet* compound, hesperetin dihydrochalcone glucoside. This compound exhibits a sweetness about equal to that of saccharin, on a molar basis. Moreover, hesperetin dihydrochalcone glucoside imparts a more agreeable sweetness (i.e., less clinging and absence of bitter or other secondary taste effects) than some of the other dihydrochalcone sweeteners such as naringin dihydrochalcone or prunin dihydrochalcone.

The invention is further demonstrated by the following illustrative example.

EXAMPLE (A) Fifty grams of hesperidin was dissolved in 250 ml. of 10% aqueous potassium hydroxide. The solution was allowed to stand at room temperature for ½ hour to form the chalcone. The solution containing hesperidin chalcone was then used directly in the next step.

(B) Four grams of a hydrogenation catalyst (10% palladium-carbon) was added and the solution hydrogenated at 25–30 p.s.i. until the hydrogenation was complete (1–1.5 hours). The reaction mixture was filtered and the pH adjusted to 7 by addition of hydrochloric acid. The solution contained the intermediate hesperidin dihydrochalcone.

(C) The neutralized solution was diluted to 600 ml. with water. Five ml. of concentrated (39%) hydrochloric acid was added and the solution brought rapidly to a boil. It was then boiled under reflux for 2.5–2.75 hours, when paper chromatography showed the virtual absence of hesperidin dihydrochalcone and the presence of an approximately 50:50 mixture of hesperetin dihydrochalcone and hesperetin dihydrochalcone glucoside. The cooled reaction mixture, which contained an oily product, was extracted with four 100 ml. portions of ether. Evaporation of the combined ether layers yielded 16.0 g. of hesperetin dihydrochalcone. The aqueous layer, still containing an oily product, soon began to crystallize and this process was allowed to reach completion by keeping the mixture overnight in a refrigerator. The grayish solid was collected, washed with cold water and dried in a vacuum oven at 80°. The dried product weighed 10.3 g. and was shown by paper chromatography to be pure hesperetin dihydrochalcone glucoside. An additional 1.5 g. of product was obtained by extracting the aqueous liquors with ethyl acetate. The overall yield was 11.8 g. or 31%. The hesperetin dihydrochalcone glucoside was recrystallized from ethanol with substantially no loss and was then obtained in the form of colorless needles, melting point 119–121° C. (Calculated for $C_{22}H_{26}O_{11}$: C, 56.7; H, 5.62; $CH_3O$, 6.65%. Found: C, 56.6; H, 5.66; $CH_3O$, 6.60%.) The compound gave the expected nuclear magnetic resonance spectrum and was soluble in water at 25° C. to the extent of about 0.85 gram per liter.

Having thus described the invention, what is claimed is:

1. A process for preparing hesperetin dihydrochalcone glucoside which comprises:
   (A) Contacting hesperidin with alkali to produce hesperidin chalcone,
   (B) Hydrogenating the hesperidin chalcone to produce hesperidin dihydrochalcone, and
   (C) Contacting the hesperidin dihydrochalcone with dilute acid to split off rhamnose from the rutinosyl radical of said dihydrochalcone, to produce hesperetin dihydrochalcone glucoside.

2. The process of claim 1 wherein the acid is hydrochloric acid.

3. A process for preparing hesperetin dihydrochalcone glucoside which comprises:
  (A) Providing a solution of hesperidin dihydrochalcone in dilute aqueous acid, and
  (B) Boiling said solution to split off rhamnose from the rutinosyl radical of said dihydrochalcone, to produce hesperetin dihydrochalcone glucoside.

4. A process for preparing hesperetin dihydrochalcone glucoside which comprises boiling an aqueous solution of hesperidin dihydrochalcone, containing a dilute concentration of hydrochloric acid to provide a mild hydrolytic medium, to split off rhamnose from the rutinosyl radical of said dihydrochalcone to produce hesperetin dihydrochalcone glucoside.

References Cited
UNITED STATES PATENTS

| | | | |
|---|---|---|---|
| 2,700,047 | 1/1955 | Wilson | 260—210 |
| 3,087,821 | 4/1963 | Horowitz et al. | 260—210 |
| 3,284,439 | 11/1966 | Argoudelis | 260—210 |

LEWIS GOTTS, *Primary Examiner.*

JOHNNIE R. BROWN, *Assistant Examiner.*